United States Patent
Maeda et al.

(10) Patent No.: US 11,920,937 B2
(45) Date of Patent: Mar. 5, 2024

(54) SIDEWALK NETWORK INFORMATION GENERATION DEVICE, METHOD AND PROGRAM

(71) Applicant: NIPPON TELEGRAPH AND TELEPHONE CORPORATION, Tokyo (JP)

(72) Inventors: Atsuhiko Maeda, Musashino (JP); Manabu Yoshida, Musashino (JP); Yuki Yokohata, Musashino (JP); Ippei Shake, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 538 days.

(21) Appl. No.: 15/734,712

(22) PCT Filed: May 30, 2019

(86) PCT No.: PCT/JP2019/021501
§ 371 (c)(1),
(2) Date: Dec. 3, 2020

(87) PCT Pub. No.: WO2019/235349
PCT Pub. Date: Dec. 12, 2019

(65) Prior Publication Data
US 2021/0223050 A1 Jul. 22, 2021

(30) Foreign Application Priority Data
Jun. 4, 2018 (JP) .................................. 2018-107135

(51) Int. Cl.
*G01C 21/34* (2006.01)
*G01C 21/36* (2006.01)
(Continued)

(52) U.S. Cl.
CPC ...... *G01C 21/3407* (2013.01); *G01C 21/3626* (2013.01); *G06F 16/29* (2019.01); *G06F 16/9558* (2019.01); *H04L 67/12* (2013.01)

(58) Field of Classification Search
CPC ............ G01C 21/3407; G01C 21/3626; G01C 21/3822; G06F 16/29; G06F 16/9558; H04L 67/12; G09B 29/00
See application file for complete search history.

(56) References Cited

FOREIGN PATENT DOCUMENTS

| JP | 200786156 A | | 4/2007 |
|----|-------------|---|--------|
| JP | 2007086156 A | * | 4/2007 |

(Continued)

OTHER PUBLICATIONS

Takahiro Miura et al., Sharing Accessibility Information for People with Disabilities: Analyses of Information Acquired by Field Assessment and Crowdsourcing, the Virtual Reality Society of Japan, vol. 21, No. 2, 2016, p. 283-294.

(Continued)

*Primary Examiner* — Kim T Nguyen
(74) *Attorney, Agent, or Firm* — Harness, Dickey & Pierce, P.L.C.

(57) ABSTRACT

A sidewalk network information generation device in an embodiment includes a sidewalk centerline data storage device configured to store sidewalk centerline data indicating a plurality of sidewalk centerlines, a detection unit configured to detect an end point and a corner point of each of the plurality of sidewalk centerlines from the sidewalk centerline data stored in the sidewalk centerline data storage unit, and a link information generation unit configured to select, from among the end points and the corner points of the plurality of sidewalk centerlines detected by the detection unit, first coordinates indicating an end point or a corner point of a first sidewalk centerline and second coordinates (Continued)

indicating an end point or a corner point of a second sidewalk centerline within a certain distance from the first coordinates, and generate link information for linking the plurality of sidewalk centerlines on the basis of the selected first and second coordinates.

12 Claims, 11 Drawing Sheets

(51) Int. Cl.
    *G06F 16/29*     (2019.01)
    *G06F 16/955*     (2019.01)
    *H04L 67/12*     (2022.01)

(56) References Cited

FOREIGN PATENT DOCUMENTS

| | | | |
|---|---|---|---|
| JP | 2012202885 A | * | 10/2012 |
| JP | 2012202885 A | | 10/2012 |

OTHER PUBLICATIONS

Kenya Watanabe et al., a Basic Study on Construction of Pedestrian Space Network by Using Point Cloud Data and Digital Map, Journal of Japan Society of Civil Engineers, Ser. F3, vol. 67, No. 2, 2012, pp. 1_150-1_161.

* cited by examiner

| road_id | seg_id | point_id | latitude | longitude | width |
|---|---|---|---|---|---|
| 7842 | 0 | 0 | 35.65893058 | 139.702041 | 105.4502976 |
| 7842 | 0 | 1 | 35.6589625 | 139.701979 | 776.7952054 |
| 7842 | 0 | 2 | 35.65905827 | 139.701945 | 866.740018 |
| 7842 | 0 | 3 | 35.65922279 | 139.701923 | 1263.334226 |
| 7842 | 0 | 4 | 35.65932101 | 139.701917 | 1519.534978 |
| 7842 | 1 | 0 | 35.65932101 | 139.701917 | 1519.534978 |
| 7842 | 1 | 1 | 35.65938731 | 139.701815 | 452.1144209 |
| 7842 | 1 | 2 | 35.65939222 | 139.701799 | 360.3326407 |
| 7842 | 1 | 3 | 35.65939468 | 139.701763 | 271.2686525 |
| 7842 | 1 | 4 | 35.65936766 | 139.701473 | 355.3055599 |
| 7842 | 1 | 5 | 35.65937503 | 139.701455 | 186.1921144 |
| 7842 | 1 | 6 | 35.65937503 | 139.701429 | 126.5920379 |
| 7842 | 2 | 0 | 35.6594045 | 139.702315 | 271.2686525 |
| 7842 | 2 | 1 | 35.65941432 | 139.702295 | 488.2835746 |
| 7842 | 2 | 2 | 35.65941678 | 139.702237 | 707.3821008 |
| 7842 | 2 | 3 | 35.65940941 | 139.702201 | 743.4498932 |
| 7842 | 2 | 4 | 35.65935784 | 139.701995 | 1067.602894 |
| 7842 | 2 | 5 | 35.65932101 | 139.701917 | 1519.534978 |

Fig. 2

| road_id | seg_id | point_id | latitude | longitude | width |
|---|---|---|---|---|---|
| 7571 | 0 | 0 | 35.69272917 | 139.705425 | 25.1989008 |
| 7571 | 0 | 1 | 35.69271148 | 139.7054342 | 228.0736893 |
| 7571 | 0 | 2 | 35.69270583 | 139.7054394 | 302.0774007 |
| 7571 | 0 | 3 | 35.69270338 | 139.705443 | 324.5211681 |
| 7571 | 0 | 4 | 35.69269528 | 139.705458 | 388.2923316 |
| 7571 | 0 | 5 | 35.69263784 | 139.7056858 | 404.0800301 |
| 7571 | 0 | 6 | 35.69263563 | 139.705704 | 376.4373196 |
| 7571 | 0 | 7 | 35.69263809 | 139.7057236 | 399.587309 |
| 7571 | 0 | 8 | 35.69266042 | 139.705798 | 428.528158 |
| 7571 | 0 | 9 | 35.69267441 | 139.705824 | 364.8784665 |
| 7571 | 0 | 10 | 35.69268497 | 139.7058374 | 315.0351971 |
| 7571 | 0 | 11 | 35.69287324 | 139.7059516 | 306.7402267 |
| 7571 | 0 | 12 | 35.69288134 | 139.7059548 | 292.1652802 |
| 7571 | 0 | 13 | 35.69289411 | 139.7059524 | 195.0201725 |
| 7571 | 0 | 14 | 35.69290982 | 139.7059458 | 14.58025197 |

Fig. 3

SIDEWALK NETWORK INFORMATION GENERATION DEVICE, METHOD AND PROGRAM

CROSS-REFERENCE TO RELATED APPLICATIONS

This application is a 371 U.S. National Phase of International Application No. PCT/JP2019/021501, filed on May 30, 2019, which claims priority to Japanese Application No. 2018-107135, filed on Jun. 4, 2018. The entire disclosures of the above applications are incorporated herein by reference.

TECHNICAL FIELD

Embodiments of the present invention relate to a side walk network information generation device, method, and program.

BACKGROUND ART

Road network information with attribute information such as road width and one-way traffic constraints is essential in order to construct a system for guiding vehicles or people. The road network information is information in which a road network is represented by nodes and links. The system for guidance searches the road network information and presents an optimal path to a user. Further, when various types of attribute information are included in the road network information, the system for guidance can search for a more optimal path in consideration of the road network information.

In recent years, there has been an increasing need for side walk network information in which places being barriers or barrier free places are described for disabled people. For example, wheelchair users cannot pass through a side walk when the side walk has a steep slope and a width equal to or greater than a width of a wheelchair. Thus, it is preferable to collect information on the presence or absence of a slope of a side walk and a width of the side walk in order to achieve a system that provides smooth guidance to disabled people and wheelchair users. This information can be included in the side walk network information in which the side walks are linked.

A system for collecting barrier free information through crowdsourcing is disclosed in, for example, Non Patent Literature 1.

CITATION LIST

Non Patent Literature

Non Patent Literature 1: Takahiro Miura, Kenichiro Yabu, Shoji Sakajiri, Mari Ueda, Atsushi Hiyama, Michitaka Hirose, Tatsu Ifukube, Sharing Accessibility Information for People with Disabilities: Analyses of Information Acquired by Field Assessment and Crowdsourcing, Transactions of the Virtual Reality Society of Japan, Vol. 21 (2016) No. 2, pp. 283-294

SUMMARY OF THE INVENTION

Technical Problem

However, data of a centerline of a side walk region and data regarding a crosswalk are necessary as prerequisites in order to create side walk network information including a crosswalk, which is information for providing barrier free information.

First, link information needs to be created as information of a positional relationship that allows anyone to cross, when a distance between end points or corner points of centerlines of a sidewalk region is appropriate, and end points or corner points of the centerlines are in an appropriate positional relationship.

Second, in a case in which these sidewalks are actually linked at a crosswalk, link information needs to be created for data of a corresponding sidewalk centerline accordingly regardless of the positional relationship of the sidewalks. Further, information "crosswalk" is preferably provided to the link information in advance. However, there is no method of linking such sidewalks comprehensively and appropriately without overlap and automatically generating a sidewalk network.

The present invention has been made in view of the above circumstances, and an object of the present invention is to provide a sidewalk network information generation device, method, and program capable of efficiently generating sidewalk network information.

Means for Solving the Problem

To achieve the above object, a first aspect of a sidewalk network information generation device in an embodiment of the present invention is a sidewalk network information generation device including: a sidewalk centerline data storage device configured to store sidewalk centerline data indicating a plurality of sidewalk centerlines; a detection unit configured to detect an end point and a corner point of each of the plurality of sidewalk centerlines from the sidewalk centerline data stored in the sidewalk centerline data storage device; and a link information generation unit configured to select, from among the end points and the corner points of the plurality of sidewalk centerlines detected by the detection unit, first coordinates indicating an end point or a corner point of a first sidewalk centerline and second coordinates indicating an end point or a corner point of a second sidewalk centerline within a certain distance from the first coordinates, and generate link information for linking the plurality of sidewalk centerlines on the basis of the selected first and second coordinates.

A second aspect of the sidewalk network information generation device of the present invention is the sidewalk network information generation device according to the first aspect, further including: a crosswalk data storage device configured to store data indicating coordinates of one or more crosswalks, wherein, when the coordinates of the crosswalk stored in the crosswalk data storage device are present between the selected first and second coordinates, the link information generation unit provides attribute information indicating the presence of the crosswalk to the link information.

A third aspect of the sidewalk network information generation device of the present invention is the sidewalk network information generation device according to the first aspect, wherein, when at least one of the selected first and second coordinates indicate the end point, the link information generation unit generates the link information when a first line segment linking the end point to another end point or the corner point of the same sidewalk centerline adjacent to the end point and a second line segment linking the selected first and second coordinates form a continuous straight line.

A fourth aspect of the sidewalk network information generation device of the present invention is the sidewalk network information generation device according to the second aspect, wherein, when at least one of the selected first and second coordinates indicate the end point, the link information generation unit generates the link information when a first line segment linking the end point to another end point or the corner point of the same sidewalk centerline adjacent to the end point and a second line segment linking the selected first and second coordinates form a continuous straight line.

A fifth aspect of the sidewalk network information generation device of the present invention is the sidewalk network information generation device according to the first aspect, further including: a crosswalk data storage device configured to store data indicating coordinates of one or more crosswalks; an interpolation unit configured to interpolate coordinates between a plurality of points on the sidewalk centerline forming the sidewalk centerline data into the sidewalk centerline data; and a crosswalk start point link information generation unit configured to detect, as third coordinates, from the sidewalk centerline data after the interpolation of the interpolation unit, coordinates of an intersection between a straight line to a sidewalk centerline at a shortest distance from coordinates of the crosswalk stored in the crosswalk data storage device and the sidewalk centerline, detect, as fourth coordinates, from the sidewalk centerline data after the interpolation, coordinates of an intersection between a straight line to a sidewalk centerline different from the sidewalk centerline including the third coordinates, the sidewalk centerline being at a shortest distance from the coordinates of the same crosswalk, and the sidewalk centerline, and generate link information of the sidewalk centerlines across the crosswalk for linking the detected third and fourth coordinates.

A sixth aspect of the sidewalk network information generation device of the present invention is the sidewalk network information generation device according to the fifth aspect, further including: a deletion unit configured to delete, from the sidewalk centerline data, coordinates of a point not used for link information between the sidewalk centerlines across the crosswalk among coordinates of respective points on the sidewalk centerline after the interpolation executed by the interpolation unit.

An aspect of a sidewalk network information generation method performed by a sidewalk network information generation device in an embodiment of the present invention is a sidewalk network information generation method, including: detecting an end point and a corner point of each of a plurality of sidewalk centerlines from sidewalk centerline data indicating the plurality of sidewalk centerlines; and selecting, from among the detected end points and corner points of the plurality of sidewalk centerlines, first coordinates indicating an end point or a corner point of a first sidewalk centerline and second coordinates indicating an end point or a corner point of a second sidewalk centerline within a certain distance from the first coordinates, and generating link information for linking the plurality of sidewalk centerlines on the basis of the selected first and second coordinates.

An aspect of a sidewalk network information generation processing program according to an embodiment of the present invention is a sidewalk network information generation processing program for causing a processor to function as each of the units of the sidewalk network information generation device according to any one of the first to sixth aspects.

Effects of the Invention

According to the first aspect of the sidewalk network information generation device in an embodiment of the present invention, the link information for linking a plurality of sidewalk centerlines is generated on the basis of the first coordinates indicating the end point or corner point of the sidewalk centerline and the second coordinates indicating the end point or corner point of the other sidewalk centerline within the certain distance from the first coordinates. This allows the sidewalk network information to be efficiently generated.

According to the second aspect of the sidewalk network information generation device in an embodiment of the present invention, in the first aspect, the attribute information indicating the presence of the crosswalk is provided to the link information when the coordinates of the crosswalk are present between the first and second coordinates. This allows information on the crosswalk to be included in the sidewalk network information.

According to the third aspect of the sidewalk network information generation device in an embodiment of the present invention, when at least one of the first and second coordinates indicate an end point, in the first aspect, the link information is generated when the first line segment linking the end point and the other end point or corner point of the same sidewalk centerline adjacent to the end point and the second line segment linking the first and second coordinates form a continuous straight line. This allows a case in which places that should not be originally linked are linked to be avoided, and allows the link information to be generated more accurately.

According to the fourth aspect of the sidewalk network information generation device in an embodiment of the present invention, when at least one of the first and second coordinates indicate an end point, in the second aspect, the link information is generated when the first line segment linking the end point and the other end point or corner point of the same sidewalk centerline adjacent to the end point and the second line segment linking the first and second coordinates form a continuous straight line. This allows a case in which places that should not be originally linked are linked to be avoided, and allows the link information to be generated more accurately.

According to the fifth aspect of the sidewalk network information generation device in an embodiment of the present invention, in the first aspect, the link information for the sidewalk centerlines across the crosswalk is generated, the link information being for linking the third coordinates that are coordinates of the intersection between the straight line to the sidewalk centerline at the shortest distance from the coordinates of the crosswalk and the sidewalk centerline and the fourth coordinates that are coordinates of the intersection between the straight line to the sidewalk centerline which is different from the sidewalk centerline including the third coordinates and is at a shortest distance from the coordinates of the same crosswalk and the sidewalk centerline. This allows link information corresponding to the crosswalk between different sidewalk centerlines to be generated.

According to the sixth aspect of the sidewalk network information generation device in an embodiment of the present invention, in the fifth aspect, coordinates of points not used for the link information for the sidewalk centerlines across the crosswalk, among the coordinates of respective points on the sidewalk centerline after the interpolation, are deleted from the sidewalk centerline data. This allows a size of the sidewalk centerline data indicating the link information to be reduced.

That is, according to the present invention, it is possible to efficiently generate the sidewalk network information.

BRIEF DESCRIPTION OF DRAWINGS

FIG. 2 is a diagram illustrating an example of sidewalk centerline vector data.

FIG. 3 is a diagram illustrating an example of the sidewalk centerline vector data.

DESCRIPTION OF EMBODIMENTS

Hereinafter, one embodiment of the present invention will be described below with reference to the drawings.

Figure 1:
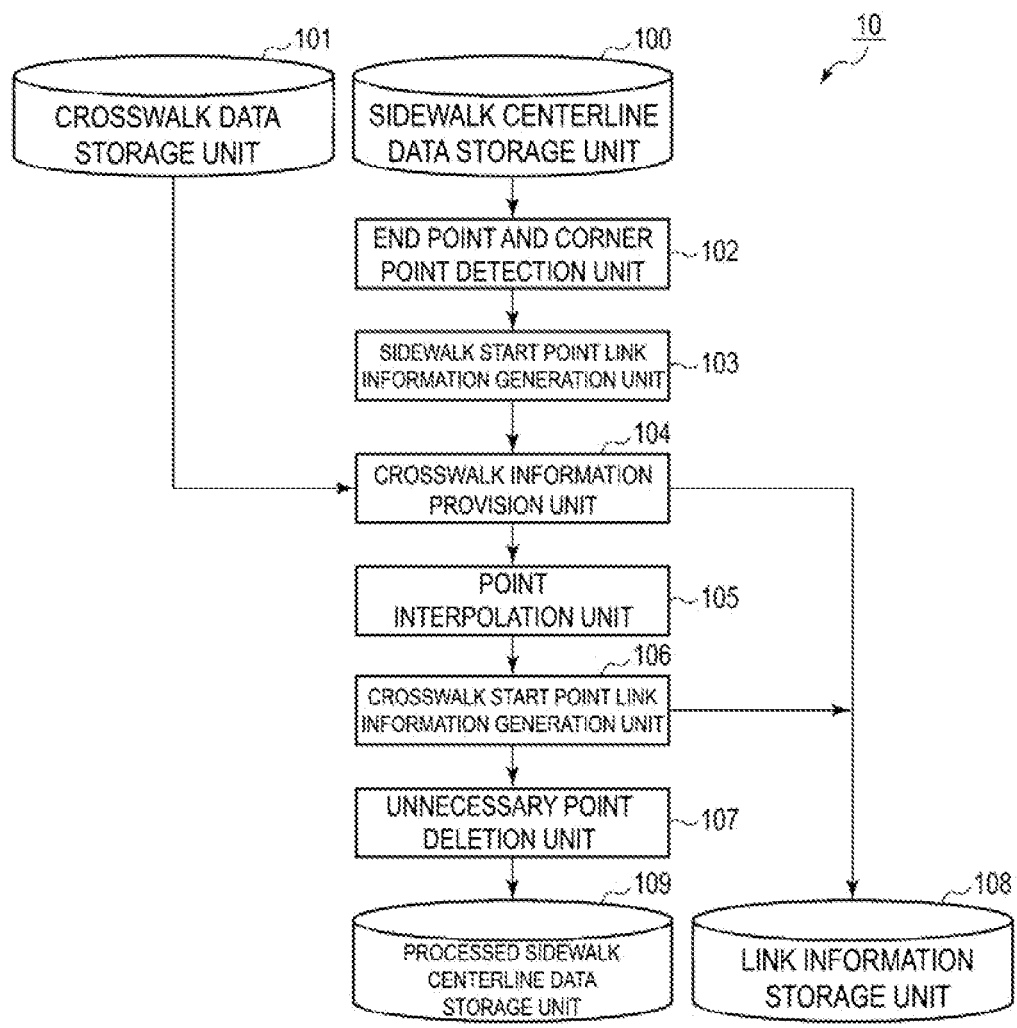
FIG. 1 is a diagram illustrating an example of an application of a sidewalk network information generation device according to an embodiment of the present invention.

FIG. 1 is a diagram illustrating one application of a sidewalk network information generation device in an embodiment of the present invention.

A sidewalk network information generation device 10 includes a sidewalk centerline data storage unit (a sidewalk centerline data storage device) 100, a crosswalk data storage unit (a crosswalk data storage device) 101, an end point and corner point detection unit 102, a sidewalk start point link information generation unit 103, a crosswalk information provision unit 104, a point interpolation unit 105, a crosswalk start point link information generation unit 106, an unnecessary point deletion unit 107, a link information storage unit (a link information storage device) 108, and a processed sidewalk centerline data storage unit (a processed sidewalk centerline data storage device) 109, as illustrated in FIG. 1. Details of each unit will be described below.

Further, the sidewalk network information generation device 10 can be achieved by a system in which a computer device such as a personal computer (PC) is used. For example, the computer device includes a processor such as a Central Processing Unit (CPU), a memory connected to the processor, and an input and output interface. Among these, the memory is configured using a storage device having a storage medium such as a non-volatile memory on which writing and reading can be performed at any time.

Functions of the end point and corner point detection unit 102, the sidewalk start point link information generation unit 103, the crosswalk information provision unit 104, the point interpolation unit 105, the crosswalk start point link information generation unit 106, and the unnecessary point deletion unit 107 are achieved, for example, by the processor reading and executing a program stored in the memory. Some or all of these functions may be achieved by a circuit such as an Application Specific Integrated Circuit (ASIC).

The sidewalk centerline data storage unit 100, the crosswalk data storage unit 101, the link information storage unit 108, and the processed sidewalk centerline data storage unit 109 are provided, for example, in the non-volatile memory.

The sidewalk network information generation device 10 links the sidewalk centerlines indicated by the sidewalk centerline vector data using the crosswalk data to automatically generate the sidewalk network information. The sidewalk centerline vector data may be referred to as sidewalk centerline data.

The sidewalk centerline vector data is stored in the sidewalk centerline data storage unit 100. The crosswalk data is stored in the crosswalk data storage unit 101.

FIGS. 2 and 3 are diagrams each illustrating an example of the sidewalk centerline vector data. Each sidewalk is provided with a road_id, as illustrated in FIGS. 2 and 3. Further, a seg_id is assigned to each of line segments between end points and an intersection, which constitute the sidewalk.

In the line segment corresponding to each seg_id, an unique point_id is provided to a plurality of points having information of latitude, longitude, and width. When the longitude and latitude are plotted in order of the point_id number, the sidewalk centerlines can be visualized.

Figure 4:
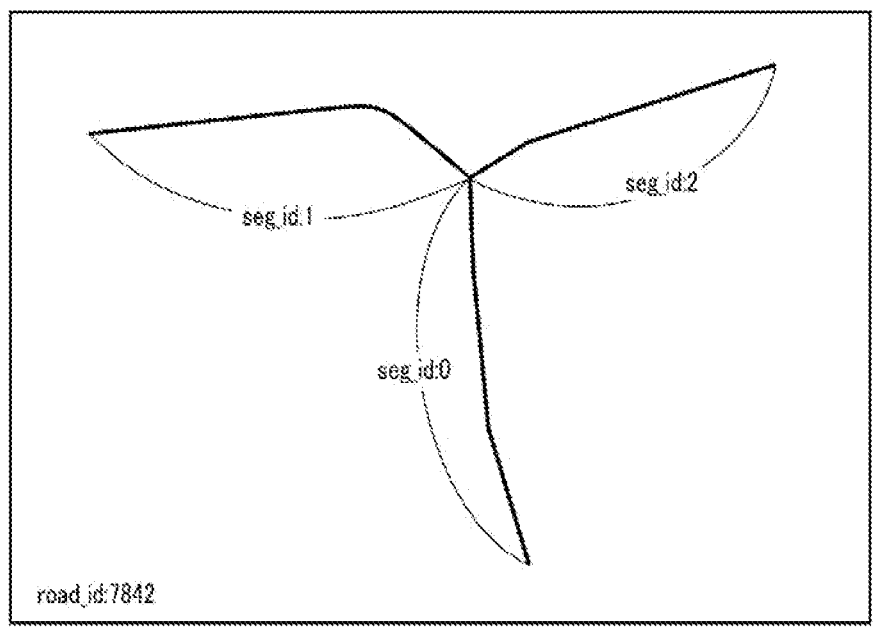
FIG. 4 is a diagram illustrating an example in which a sidewalk centerline has been visualized.
Figure 5:
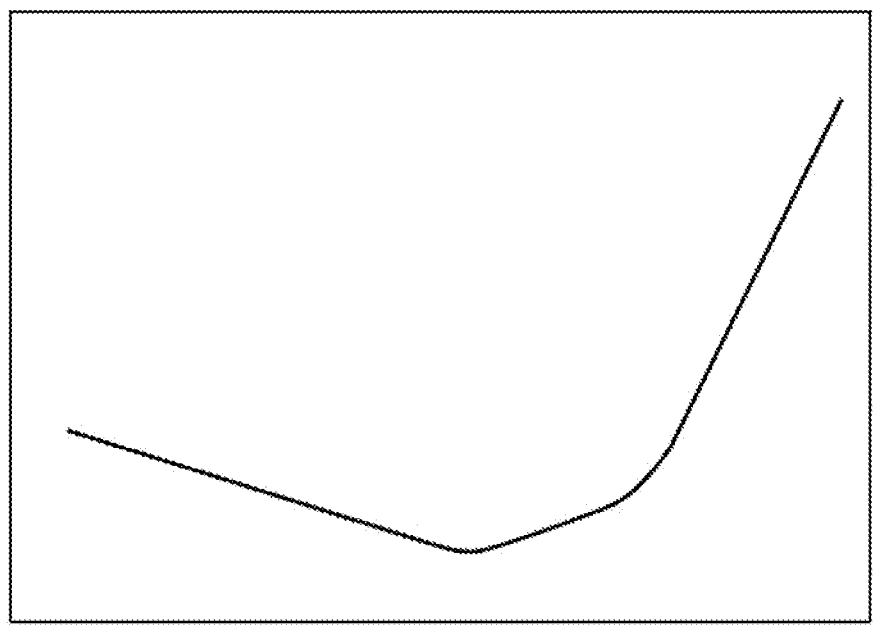
FIG. 5 is a diagram illustrating an example in which the sidewalk centerline has been visualized.

FIGS. 4 and 5 are diagrams illustrating an example in which the sidewalk centerlines are visualized. An example in which the sidewalk centerline vector data shown in FIG. 2 is visualized is illustrated in FIG. 4, and an example in which the sidewalk centerline vector data shown in FIG. 3 is visualized is illustrated in FIG. 5.

Most sidewalks (corresponding to road_id) have no intersection, as illustrated in FIG. 5. In this case, there is only one type ("0") of seg_id corresponding to road_id ("7571"), as illustrated in FIG. 3.

However, in some cases, a sidewalk may have an intersection, as in FIG. 4. In this case, a plurality of types of seg_ids ("0", "1", or "2") are associated with a road_id ("7842"), as illustrated in FIG. 2.

Figure 6:
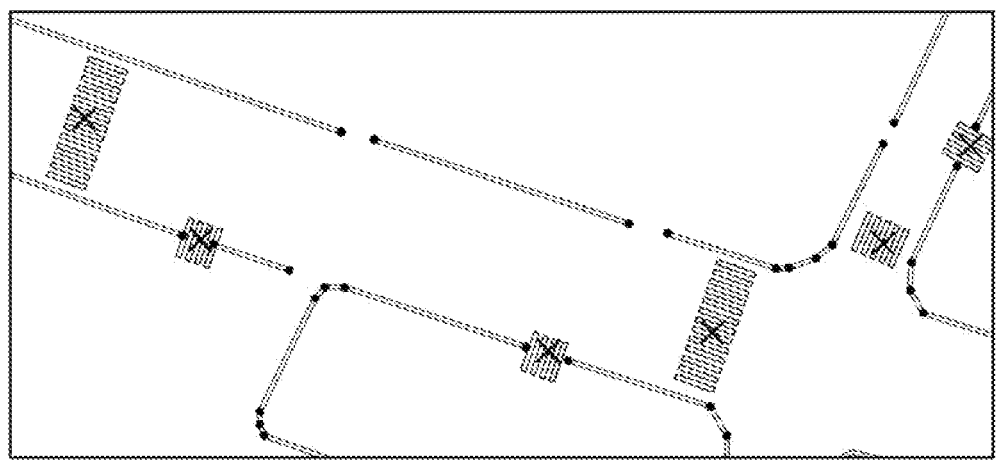
FIG. 6 is a diagram illustrating an example of a result of visualizing a plurality of pieces of sidewalk centerline vector data.

FIG. 6 is a diagram illustrating an example of a result of visualizing a plurality of pieces of sidewalk centerline vector data. Black circles shown in FIG. 6 correspond to points corresponding to point_ids forming the sidewalk centerline vector data, and a line linking these points is the centerline of the sidewalk.

Position information of crosswalks is also illustrated in FIG. 6. A position of an X mark shown in FIG. 6 is center coordinates of each crosswalk. This position information includes latitude and longitude and is represented in the same manner as the latitude and longitude of the point corresponding to the point_id of the sidewalk centerline.

The sidewalk centerline vector data and the position information of the crosswalk may be created through surveying or manual work or may be created using any method as long as the sidewalk centerline vector data and the position information can be automatically created using the method.

Figure 7:
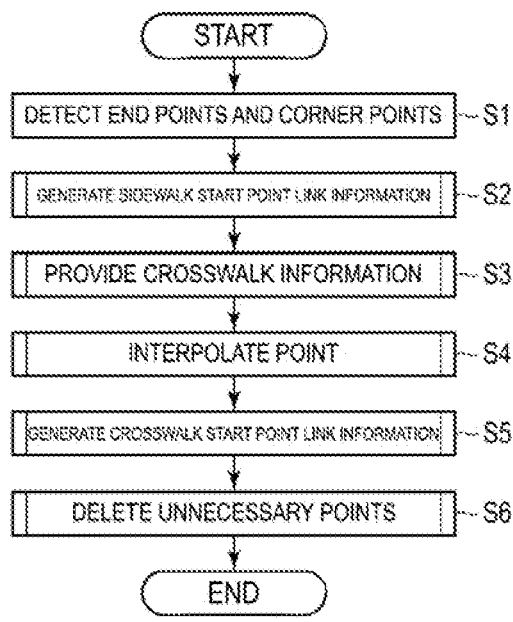
FIG. 7 is a diagram illustrating an example of a processing procedure of the sidewalk network information generation device in an embodiment of the present invention.

Next, processing of the sidewalk network information generation device 10 will be described. FIG. 7 is a diagram illustrating an example of a processing procedure of the sidewalk network information generation device in an embodiment of the present invention.

Detection of End Points and Corner Points First, the end point and corner point detection unit 102 reads out the sidewalk centerline vector data from the sidewalk centerline data storage unit 100 and detects end points and corner points of the sidewalk centerline from all of the sidewalk centerline vector data (S1).

Here, among a point at which the point_id associated with each seg_id corresponding to a certain road_id is "0" and a point at which a numerical value of a point_id is largest in the sidewalk centerline vector data, a point at which the latitude and longitude do not overlap with those at a point corresponding to another point_id corresponding to the same road_id becomes the end point.

The end point and corner point detection unit 102 first obtains a distance of the line segment linking the points corresponding to point_ids associated with each individual seg_id associated with a road_id on the sidewalk centerline vector data using a Huvenian formula for obtaining a distance from the latitude and longitude.

Then, the end point and corner point detection unit 102 detects, as the corner point C, a point corresponding to a point_id corresponding to the middle as much as possible when viewed from the two line segments having the obtained distance equal to or greater than a certain length L (for example, 5.5 [m]), and updates the sidewalk centerline vector data with information on the end point and the corner point.

Figure 8:
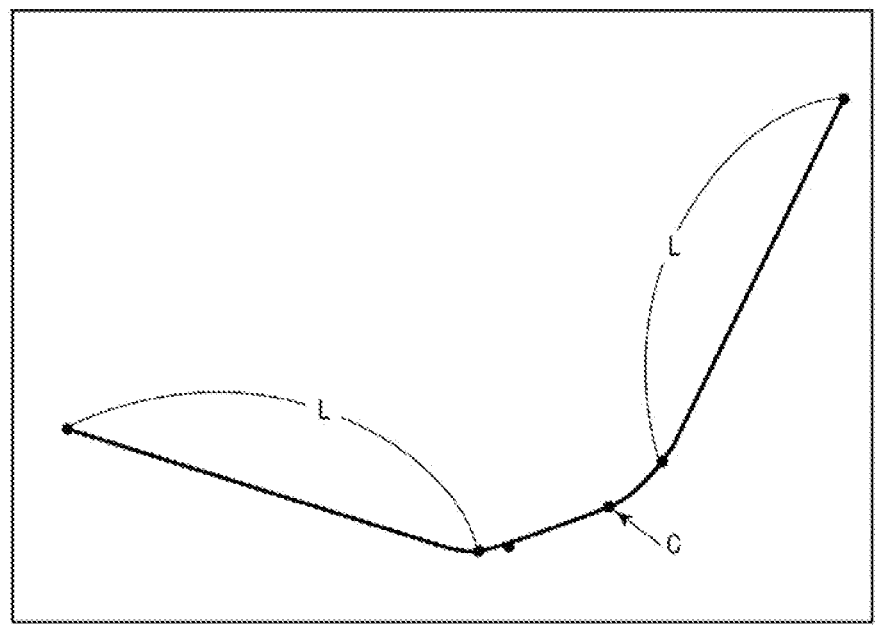
FIG. 8 is a diagram illustrating detection of corner points.

FIG. 8 is a diagram illustrating the detection of the corner points. The point_id corresponding to the middle as much as possible is a point_id corresponding to a point at a place near the middle of the length of the line segment between the two line segments having a length equal to or greater than a certain length.

Figure 9:
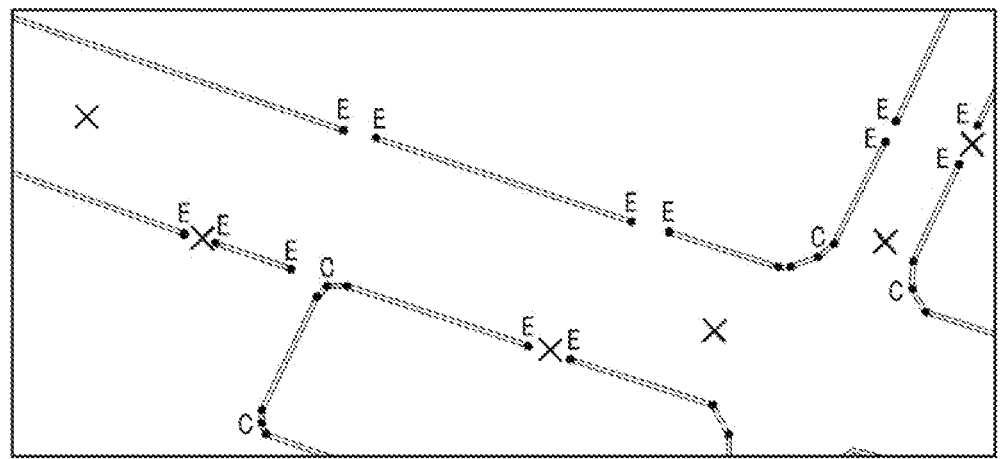
FIG. 9 is a diagram illustrating a first example of a detection result of the corner points.

FIG. 9 is a diagram illustrating a first example of a detection result of the corner points. FIG. 9 is a result of detecting end points and corner points from the data obtained by visualizing the sidewalk centerline vector data shown in FIG. 6. In FIG. 9, points marked with E are end points, and points marked with C are corner points.

Figure 10:
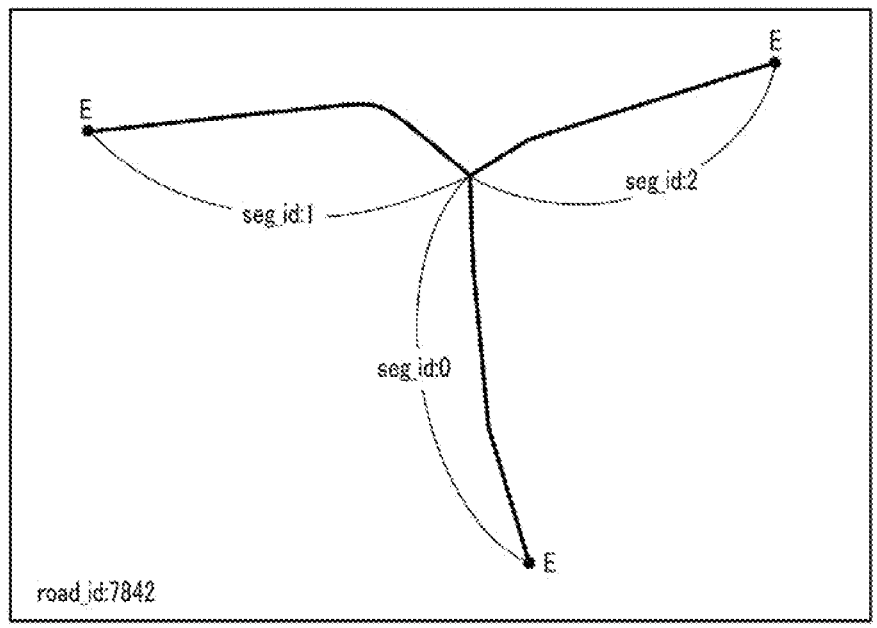
FIG. 10 is a diagram illustrating a second example of a detection result of the corner points.

FIG. 10 is a diagram illustrating a first example of the detection result of the corner points. When there are three line segments corresponding to a seg_id as illustrated in FIG. 4, three end points (E) are detected as illustrated in FIG. 10.

Generation of sidewalk Start Point Link Information

Then, the sidewalk start point link information generation unit 103 generates sidewalk start point link information for linking the sidewalk centerlines in the sidewalk centerline vector data using the end point (E) and the corner point (C) of the sidewalk centerline shown in the sidewalk centerline vector data as start points (S2).

Figure 11:
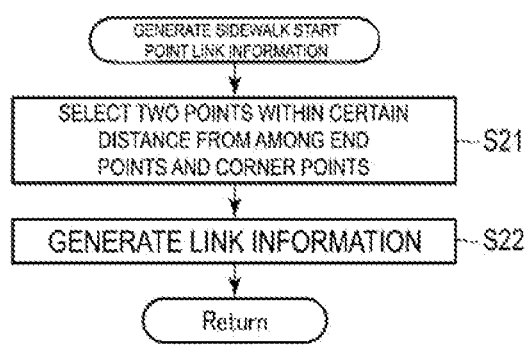
FIG. 11 is a diagram illustrating an example of a procedure of sidewalk start point link information generation processing executed by the sidewalk network information generation device according to an embodiment of the present invention.

A specific example of the sidewalk start point link information generation processing will be described in S21 to S22 below. FIG. 11 is a diagram illustrating an example of a procedure of the sidewalk start point link information generation processing executed by the sidewalk network information generation device according to an embodiment of the present invention.

First, the sidewalk start point link information generation unit 103 selects first and second coordinates corresponding to two points within a certain distance (for example, 15 [m]) from the end point or the corner point indicated by the sidewalk centerline vector data after processing executed by the end point and corner point detection unit 102 (S21).

Then, the sidewalk start point link information generation unit 103 generates sidewalk start point link information for linking the sidewalk centerlines in the sidewalk centerline vector data on the basis of the first and second selected coordinates (S22).

The first coordinates correspond to an end points or a corner point on the first sidewalk centerline. The second coordinates correspond to an end point or a corner point on a second sidewalk centerline different from the first sidewalk centerline. The sidewalk start point link information includes information of presence or absence of a crosswalk in addition to the information of the longitude and latitude of the start point and the longitude and latitude of the end point of the sidewalk centerline.

The sidewalk start point link information generation unit 103 may perform processes shown in (1), (2), and (3) below.
(1) When the first and second coordinates within the certain distance are selected from among the end points and the corner points as described above and at least one of the first and second coordinates is the end point of the sidewalk centerline, the sidewalk start point link information generation unit 103 identifies a first line segment that is a line segment linking the end point to a point in the same sidewalk centerline adjacent to the end point, and a second line segment that is a line segment linking the two selected points.
(2) The sidewalk start point link information generation unit 103 determines whether or not the first line segment and the second line segment are aligned.
(3) The sidewalk start point link information generation unit 103 generates the sidewalk start point link information only when the sidewalk start point link information generation unit 103 determines that the first line segment and the second line segment are aligned.

In this way, although not illustrated in the drawings, a case in which places that should not be linked are linked using the sidewalk start point link information can be avoided and this makes it possible to generate the sidewalk start point link information more accurately.

Provision of Crosswalk Information

Figure 12:
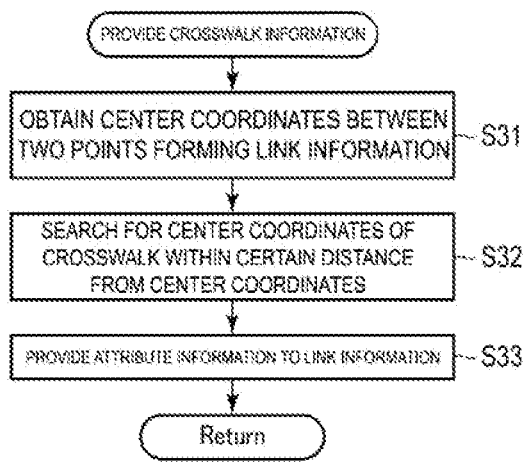
FIG. 12 is a diagram illustrating an example of a procedure of crosswalk information provision processing executed by the sidewalk network information generation device in an embodiment of the present invention.

Then, the crosswalk information provision unit 104 performs crosswalk information provision processing, which is processing of providing crosswalk information to the sidewalk start point link information (S3). A specific example of the crosswalk information provision processing will be described in S31 to S33 below. FIG. 12 is a diagram illustrating an example of a procedure of crosswalk information provision processing executed by the sidewalk network information generation device in an embodiment of the present invention.

Center coordinates between two points forming the sidewalk start point link information are obtained (S31) and center coordinates of a crosswalk within a certain distance (for example, 4 [m]) from such center coordinates is searched for (S32).

The crosswalk information provision unit 104 provides attribute information "crosswalk" to the sidewalk start point link information when the center coordinates are present, and provides attribute information "no crosswalk" to the sidewalk start point link information when the center coordinates are not present. The attribute information "crosswalk" may also be referred to as crosswalk information. The crosswalk information provision unit 104 stores the sidewalk start point link information with the attribute information provided in the link information storage unit 108 (S33).

The crosswalk information provision unit 104 deletes the sidewalk start point link information in advance so that the information on the crosswalk assumed to be within the certain distance is not again used in the processing after the sidewalk start point link information with the attribute information "crosswalk" assigned is generated.

Figure 13:
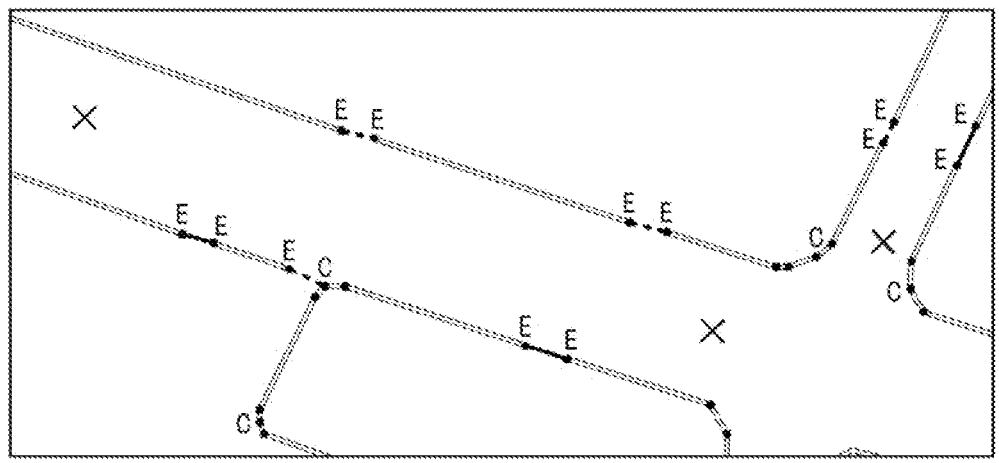
FIG. 13 is a diagram illustrating an example of a crosswalk information provision result.

FIG. 13 is a diagram illustrating an example of a crosswalk information provision result. In FIG. 13, the sidewalk start point link information with the attribute information "crosswalk" provided is indicated as a black straight line, and the sidewalk start point link information with the attribute information "no crosswalk" provided is indicated as a black dotted line.

Then, the sidewalk network information generation device 10 generates the crosswalk start point link information using the information of the left crosswalk as a start point.

Interpolation of Points

The point interpolation unit 105 initially performs point interpolation processing to generate the crosswalk start point link information (S4). This point interpolation processing is processing of inserting (interpolating) coordinates of a new point between points corresponding to the point_id on the sidewalk centerline forming the sidewalk centerline vector data after the sidewalk start point link information including the attribute information is generated.

Figure 14:
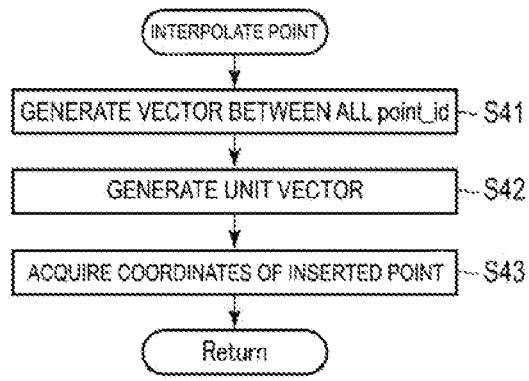
FIG. 14 is a diagram illustrating an example of a procedure of a point interpolation processing executed by the sidewalk network information generation device in an embodiment of the present invention.

A specific example of the point interpolation processing will be described in S41 to S43 below. FIG. 14 is a diagram illustrating an example of a procedure of the point interpolation processing executed by the sidewalk network information generation device in an embodiment of the present invention.

Specifically, the point interpolation unit 105 generates a vector for between points each corresponding to point_ids on all the sidewalk centerlines in the sidewalk centerline data (S41). The point interpolation unit 105 acquires a distance of each vector using the Huvenian formula to generate a unit vector (S42). The point interpolation unit 105 acquires coordinates of an inserted point by multiplying the unit vector by a certain value (S43).

Figure 15:
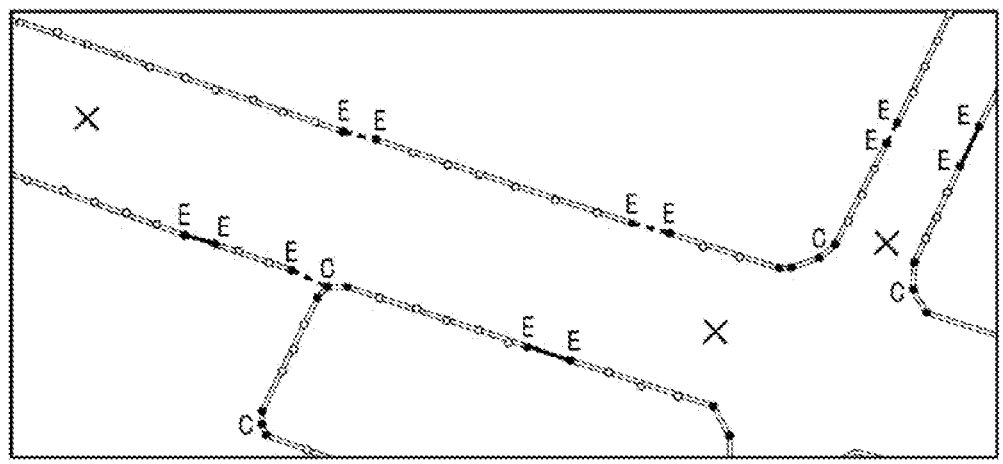
FIG. 15 is a diagram illustrating an example of point interpolation results.

FIG. 15 is a diagram illustrating an example of point interpolation results. In FIG. 15, a result of inserting coordinates of a new point into the sidewalk centerline vector data after the sidewalk start point link information including the attribute information is generated is illustrated.

Coordinates corresponding to a white circle on the sidewalk centerline illustrated in FIG. 15 are the coordinates of the new point.

Crosswalk Start Point Link Information Generation Process

Figure 16:
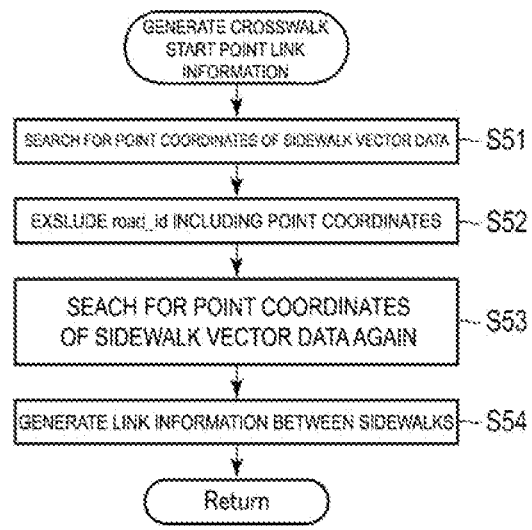
FIG. 16 is a diagram illustrating an example of a procedure of crosswalk start point link information generation processing executed by the sidewalk network information generation device in an embodiment of the present invention.

Then, the crosswalk start point link information generation unit 106 performs crosswalk start point link information generation processing (S5). A specific example of the crosswalk start point link information generation processing will be described in S51 to S54 below. FIG. 16 is a diagram illustrating an example of a procedure of the crosswalk start point link information generation processing executed by the sidewalk network information generation device in an embodiment of the present invention.

First, the crosswalk start point link information generation unit 106 searches for (detects), as third coordinates, an intersection (a point on the sidewalk centerline) between a straight line to a centerline located at a shortest distance within a certain distance such as 25 [m] from a position of the individual crosswalks shown in the interpolation results, and the sidewalk centerline from the interpolated sidewalk centerline vector data (S51). Here, search targets are not limited to the end points and the corner points (black points), and also include newly inserted point coordinates (white points).

After the point coordinates located at the shortest distance are searched for, the crosswalk start point link information generation unit 106 excludes a sidewalk centerline, relevant to the road_id corresponding to the sidewalk including the third coordinates, from the search targets (S52). The crosswalk start point link information generation unit 106 searches for (detects), as fourth coordinates, the coordinates of the intersection between the straight line to the centerline located at the shortest distance within the certain distance and the sidewalk centerline, from the sidewalk centerline vector data (S53).

The crosswalk start point link information generation unit 106 generates crosswalk start point link information with attribute information "crosswalk" provided thereto, and stores the crosswalk start point link information in the link information storage unit 108 (S54). The crosswalk start point link information is link information for linking the third coordinates searched for in S51 and the fourth coordinates searched for in S53, and is link information of sidewalk centerlines across the crosswalk.

Figure 17:
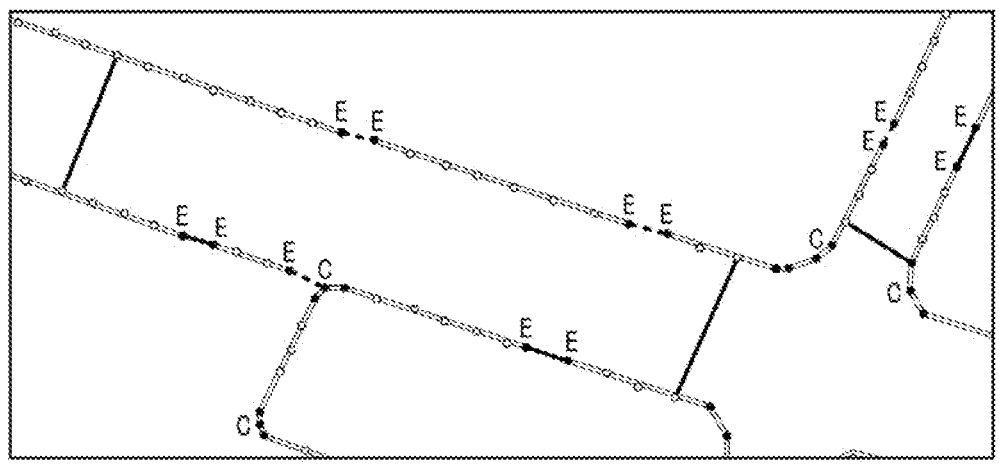
FIG. 17 is a diagram illustrating an example of a result of generating crosswalk start point link information.

FIG. 17 is a diagram illustrating an example of a result of generating the crosswalk start point link information. FIG. 17 illustrates an example in which the crosswalk start point link information with the attribute information "crosswalk" provided is added to the point interpolation results illustrated in FIG. 15. This allows link information corresponding to the crosswalk between different sidewalk centerlines to be generated.

Figure 18:
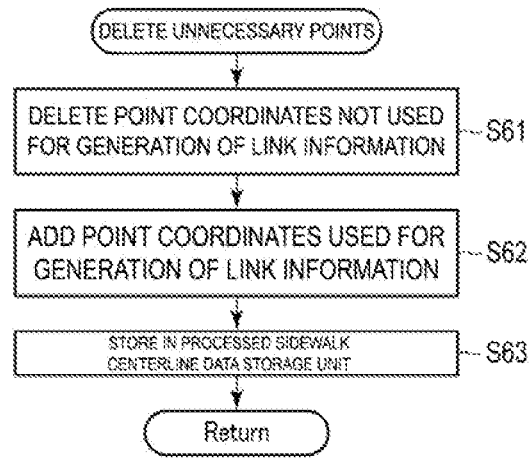
FIG. 18 is a diagram illustrating an example of a procedure of unnecessary point deletion processing executed by the sidewalk network information generation device in an embodiment of the present invention.

Deletion of Unnecessary Points Finally, the unnecessary point deletion unit 107 performs unnecessary point deletion processing (S6). A specific example of the unnecessary point deletion processing will be described in S61 to S63 below. FIG. 18 is a diagram illustrating an example of a procedure of unnecessary point deletion processing executed by the sidewalk network information generation device in an embodiment of the present invention.

The unnecessary point deletion unit 107 deletes coordinates, not used for generation of the crosswalk start point link information among the point coordinates newly inserted in the point interpolation processing, from the sidewalk centerline vector data (S61).

The unnecessary point deletion unit 107 adds point coordinates used for generation of the crosswalk start point link information to the sidewalk centerline vector data as the point corresponding to a point_id in the sidewalk corresponding to a road_id (S62).

The unnecessary point deletion unit 107 stores the data after the addition, which is processed sidewalk centerline data that is the data showing various types of link information, in the processed sidewalk centerline data storage unit 109 (S63).

Figure 19:
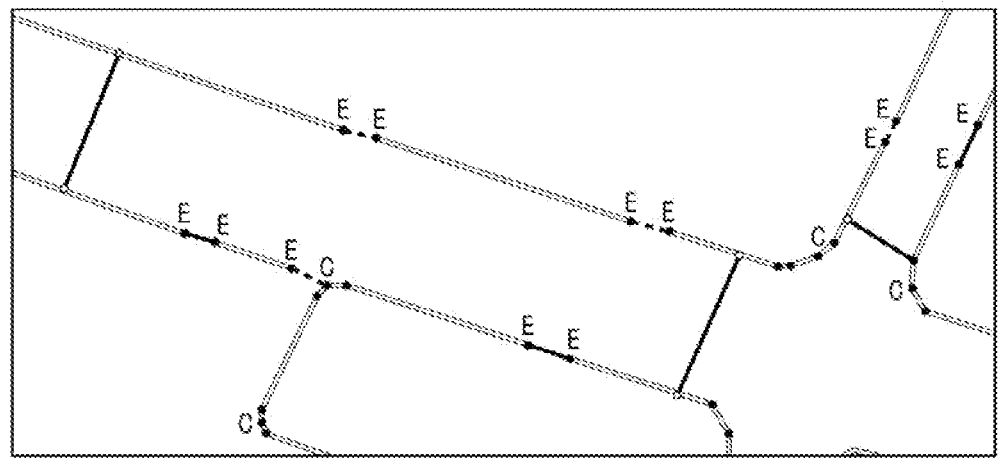
FIG. 19 is a diagram illustrating an example of an unnecessary point deletion processing result.

FIG. 19 is a diagram illustrating an example of an unnecessary point deletion processing result. Thus, the unnecessary point deletion processing can be performed to reduce a size of the processed sidewalk centerline data which shows the various types of link information is shown, and is stored in the processed sidewalk centerline data storage unit 109.

As described above, the sidewalk network information generation device in an embodiment of the present invention, when the sidewalk centerline data and the crosswalk data are provided, links the sidewalk centerline data comprehensively and appropriately without overlap by utilizing the crosswalk data and thus automatically generates the sidewalk network information. This allows the sidewalk network information to be efficiently generated.

The present invention is not limited to the embodiments, and various modifications can be made without departing from the gist of the present invention in an implementing stage. Furthermore, the embodiments may be implemented in combination appropriately as long as it is possible, and in this case, combined effects can be obtained. Further, the above embodiments include inventions on various stages, and various inventions may be extracted by appropriate combinations of the disclosed multiple configuration requirements.

Further, a scheme described in each embodiment can be stored in a recording medium such as a magnetic disk (a Floppy (trade name) disk, a hard disk, or the like), an optical disc (a CD-ROM, a DVD, an MO, or the like), a semiconductor memory (a ROM, a RAM, a flash memory, or the like) or transferred by a communication medium for distribution, as a program (a software unit) that can be executed by a computing machine (a computer). Note that the program stored on the medium side includes a setting program for configuring, in a computing device, a software means (including not only an execution program but also a table and a data structure) to be executed by the computing device. The computing device which realizes the present information processing device reads the program recorded in the recording medium, optionally builds the software means by the setting program, and executes the above-described processing by controlling the operation with the software means. Note that the recording medium referred to herein is not limited to a recording medium for distribution, but includes a storage medium such as a magnetic disk or a semiconductor memory provided in a computing machine or a device connected via a network.

REFERENCE SIGNS LIST

10 Sidewalk network information generation device
100 Sidewalk centerline data storage unit
101 Crosswalk data storage unit
102 End point and corner point detection unit
103 Sidewalk start point link information generation unit
104 Crosswalk information provision unit
105 Point interpolation unit
106 Crosswalk start point link information generation unit
107 Unnecessary point deletion unit
108 Link information storage unit
109 Processed sidewalk centerline data storage unit

The invention claimed is:

1. A sidewalk network information generation device comprising:
    a sidewalk centerline data storage device configured to store sidewalk centerline data indicating a plurality of sidewalk centerlines;
    a storage medium configured to store computer program instructions; and
    a processor configured to execute the computer program instructions so as to:
        detect a plurality of end points and a plurality of corner points of the plurality of sidewalk centerlines from the sidewalk centerline data stored in the sidewalk centerline data storage device;
        select, from among the plurality of end points and the plurality of corner points of the plurality of sidewalk centerlines, a first coordinate indicating a first end point or a first corner point of a first sidewalk centerline of the plurality of sidewalk centerlines and a second coordinate indicating a second end point or a second corner point of a second sidewalk centerline of the plurality of sidewalk centerlines within a certain distance from the first coordinate; and
        generate link information for linking the plurality of sidewalk centerlines based on the selected first and second coordinates,
    wherein, when the selected first coordinate indicates the first end point, the processor is further configured to generate first link information of the link information, and
    the first link information is generated under only a first condition in which a first line segment linking the first end point to another end point or another corner point of the first sidewalk centerline and a second line segment linking the selected first and second coordinates form a continuous straight line.

2. The sidewalk network information generation device according to claim 1, further comprising:
    a crosswalk data storage device configured to store data indicating crosswalk coordinates of one or more crosswalks,
    wherein, when the crosswalk coordinates of a first crosswalk of the one or more crosswalks stored in the crosswalk data storage device are present between the selected first and second coordinates, the processor is further configured to provide attribute information indicating the presence of the crosswalk coordinates of the first crosswalk to the link information.

3. The sidewalk network information generation device according to claim 1, further comprising:
    a crosswalk data storage device configured to store data indicating crosswalk coordinates of one or more crosswalks including a first crosswalk; wherein the processor is further configured to:
        add a plurality of interpolate points corresponding to interpolate coordinates between points of the plurality of end points and the plurality of corner points of the plurality of sidewalk centerlines into the sidewalk centerline data to form interpolate sidewalk centerline data;

detect a third coordinate from the interpolate sidewalk centerline data, the third coordinate corresponding to a first intersection between a first straight line and a third sidewalk centerline of the plurality of sidewalk centerlines, the first straight line connecting between one of the crosswalk coordinates of the first crosswalk and the third sidewalk centerline that is located closest to the one of the crosswalk coordinates of the first crosswalk;

detect a fourth coordinate from the interpolate sidewalk centerline data, the fourth coordinate corresponding to a second intersection between a second straight line and a fourth sidewalk centerline of the plurality of sidewalk centerlines different from the third sidewalk centerline, the second straight line connecting between the one of the crosswalk coordinates of the first crosswalk and the fourth sidewalk centerline that is located next closest to the one of the crosswalk coordinates of the first crosswalk; and generate second link information of the link information for the third and fourth sidewalk centerlines across the first crosswalk for linking the detected third and fourth coordinates.

4. The sidewalk network information generation device according to claim 3,
wherein the processor is further configured to delete a first number of the interpolate coordinates that are not used for generating the second link information from the interpolate sidewalk centerline data.

5. A sidewalk network information generation method for causing a processor to execute computer program instructions, the sidewalk network information generation method comprising executing on the processor steps of:

detecting a plurality of end points and a plurality of corner points of a plurality of sidewalk centerlines from sidewalk centerline data indicating the plurality of sidewalk centerlines;

selecting, from among the plurality of end points and the plurality of corner points of the plurality of sidewalk centerlines, a first coordinate indicating a first end point or a first corner point of a first sidewalk centerline of the plurality of sidewalk centerlines and a second coordinate indicating a second end point or a second corner point of a second sidewalk centerline of the plurality of sidewalk centerlines within a certain distance from the first coordinate; and generating link information for linking the plurality of sidewalk centerlines based on the selected first and second coordinates, wherein, when the selected first coordinate indicates the first end point, the processor is further configured to generate first link information of the link information, and the first link information is generated under only a first condition in which a first line segment linking the first end point to another end point or another corner point of the first sidewalk centerline and a second line segment linking the selected first and second coordinates form a continuous straight line.

6. The sidewalk network information generation method according to claim 5, further comprising:
storing data indicating crosswalk coordinates of one or more crosswalks, wherein, when the crosswalk coordinates of a first crosswalk of the one or more crosswalks are present between the selected first and second coordinates, attribute information indicating the presence of the crosswalk coordinates of the first crosswalk is provided to the link information.

7. The sidewalk network information generation method according to claim 5, further comprising:
storing data indicating crosswalk coordinates of one or more crosswalks including a first crosswalk;

adding a plurality of interpolate points corresponding to interpolate coordinates between points of the plurality of end points and the plurality of corner points of the plurality of sidewalk centerlines into the sidewalk centerline data to form interpolate sidewalk centerline data;

detecting a third coordinate from the interpolate sidewalk centerline data, the third coordinate corresponding to a first intersection between a first straight line and a third sidewalk centerline of the plurality of sidewalk centerlines, the first straight line connecting between one of the crosswalk coordinates of the first crosswalk and the third sidewalk centerline that is located closest to the one of the crosswalk coordinates of the first crosswalk;

detecting a fourth coordinate from the interpolate sidewalk centerline data, the fourth coordinate corresponding to a second intersection between a second straight line and a fourth sidewalk centerline of the plurality of sidewalk centerlines different from the third sidewalk centerline, the second straight line connecting between the one of the crosswalk coordinates of the first crosswalk and the fourth sidewalk centerline that is located next closest to the one of the crosswalk coordinates of the first crosswalk; and generating second link information of the link information for the third and fourth sidewalk centerlines across the first crosswalk for linking the detected third and fourth coordinates.

8. The sidewalk network information generation method according to claim 7, further comprising:
deleting a first number of the interpolate coordinates that are not used for generating the second link information from the interpolate sidewalk centerline data.

9. A non-transitory computer-readable medium having computer program instructions for causing a computer to execute a process by a processor so as to perform steps of:

detecting a plurality of end points and a plurality of corner points of a plurality of sidewalk centerlines from sidewalk centerline data indicating the plurality of sidewalk centerlines;

selecting, from among the plurality of end points and the plurality of corner points of the plurality of sidewalk centerlines, a first coordinate indicating a first end point or a first corner point of a first sidewalk centerline of the plurality of sidewalk centerlines and a second coordinate indicating a second end point or a second corner point of a second sidewalk centerline of the plurality of sidewalk centerlines within a certain distance from the first coordinate; and generating link information for linking the plurality of sidewalk centerlines based on the selected first and second coordinates, wherein, when the selected first coordinate indicates the first end point, the processor is further configured to generate first link information of the link information, and the first link information is generated under only a first condition in which a first line segment linking the first end point to another end point or another corner point of the first sidewalk centerline and a second line segment linking the selected first and second coordinates form a continuous straight line.

10. The non-transitory computer-readable medium according to claim 9, having the computer program instructions for causing the computer to execute the process by the processor so as to further perform steps of:
storing data indicating crosswalk coordinates of one or more crosswalks,
wherein, when the crosswalk coordinates of a first crosswalk of the one or more crosswalks are present between the selected first and second coordinates, attribute information indicating the presence of the crosswalk coordinates of the first crosswalk is provided to the link information.

11. The non-transitory computer-readable medium according to claim 9, having the computer program instructions for causing the computer to execute the process by the processor so as to further perform steps of:
storing data indicating crosswalk coordinates of one or more crosswalks including a first crosswalk;
adding a plurality of interpolate points corresponding to interpolate coordinates between points of the plurality of end points and the plurality of corner points of the plurality of sidewalk centerlines into the sidewalk centerline data to form interpolate sidewalk centerline data;
detecting a third coordinate from the interpolate sidewalk centerline data, the third coordinate corresponding to a first intersection between a first straight line and a third sidewalk centerline of the plurality of sidewalk centerlines, the first straight line connecting between one of the crosswalk coordinates of the first crosswalk and the third sidewalk centerline that is located closest to the one of the crosswalk coordinates of the first crosswalk;
detecting a fourth coordinate from the interpolate sidewalk centerline data, the fourth coordinate corresponding to a second intersection between a second straight line and a fourth sidewalk centerline of the plurality of sidewalk centerlines different from the third sidewalk centerline, the second straight line connecting between the one of the crosswalk coordinates of the first crosswalk and the fourth sidewalk centerline that is located next closest to the one of the crosswalk coordinates of the first crosswalk; and
generating second link information of the link information for the third and fourth sidewalk centerlines across the first crosswalk for linking the detected third and fourth coordinates.

12. The non-transitory computer-readable medium according to claim 11, having the computer program instructions for causing the computer to execute the process by the processor so as to further perform steps of:
deleting a first number of the interpolate coordinates that are not used for generating the second link information from the interpolate sidewalk centerline data.

* * * * *